(12) United States Patent
Falcao et al.

(10) Patent No.: US 9,976,536 B2
(45) Date of Patent: May 22, 2018

(54) AIR TURBINE FOR APPLICATIONS IN WAVE ENERGY CONVERSION

(71) Applicant: INSTITUTO SUPERIOR TECNICO, Lisbon (PT)

(72) Inventors: Antonio Franco De Oliveira Falcao, Lisbon (PT); Luis Manuel De Carvalho Gato, Sintra (PT); Joao Carlos De Campos Henriques, Carregado (PT)

(73) Assignee: INSTITUTO SUPERIOR TECNICO, Lisbon (PT)

( * ) Notice: Subject to any disclaimer, the term of this patent is extended or adjusted under 35 U.S.C. 154(b) by 380 days.

(21) Appl. No.: 14/891,353

(22) PCT Filed: May 15, 2014

(86) PCT No.: PCT/PT2014/000033
§ 371 (c)(1),
(2) Date: Nov. 15, 2015

(87) PCT Pub. No.: WO2014/185806
PCT Pub. Date: Nov. 20, 2014

(65) Prior Publication Data
US 2016/0108885 A1   Apr. 21, 2016

(30) Foreign Application Priority Data
May 16, 2013   (PT) .......................................... 106943

(51) Int. Cl.
*F03B 13/24*    (2006.01)
*F03B 13/14*    (2006.01)

(52) U.S. Cl.
CPC ............ *F03B 13/24* (2013.01); *F03B 13/142* (2013.01); *F05B 2210/404* (2013.01); *Y02E 10/32* (2013.01); *Y02E 10/38* (2013.01)

(58) Field of Classification Search
CPC ........ F03B 13/25; F03B 13/142; F03B 13/14; F03B 13/12; F03B 13/18; Y02E 10/38;
(Continued)

(56) References Cited

U.S. PATENT DOCUMENTS

| 1,587,608 A | * | 6/1926 | Siegler ..................... F03B 3/12 416/179 |
| 9,371,815 B2 | * | 6/2016 | Franco de Oliveira Falcao ..................... F03B 3/12 |
| 9,810,195 B2 | * | 11/2017 | Natanzi ................. F03B 13/142 |

FOREIGN PATENT DOCUMENTS

| GB | 2299833 A | * | 10/1996 | .............. F03B 13/24 |
| GB | 2330625 A | * | 4/1999 | .............. F03B 13/08 |

* cited by examiner

*Primary Examiner* — Ninh H Nguyen
*Assistant Examiner* — Topaz L Elliott
(74) *Attorney, Agent, or Firm* — Mark M. Friedman

(57) ABSTRACT

The present invention relates to an air turbine capable of without change in its rotational velocity direction, efficiently absorbing the energy associated with a pressure difference between two spaces (A) and (B) of successively changing sign, as in the case of sea wave energy systems. The turbine comprises two sets of blades (I) and (II), each of which is similar to the blade system of a conventional turbine of radial-, mixed- or axial-flow type. The turbine also comprises a system of ducts that connect spaces (A) and (B) through any of the two blade sets (I) and (II). The turbine may be equipped with a fast-acting valve that stops the flow through one or both blade sets (I) and (II).

3 Claims, 8 Drawing Sheets

(58) Field of Classification Search
CPC ... Y02E 10/32; F05B 2210/404; F03D 1/0625
See application file for complete search history.

AIR TURBINE FOR APPLICATIONS IN WAVE ENERGY CONVERSION

The present invention relates to an air turbine capable of, without change in its rotational velocity direction, efficiently absorbing the energy associated with pressure differences that successively change sign, as in the case of some sea wave energy conversion systems.

FIELD OF THE INVENTION

In the last few decades, a wide variety of systems have been proposed to absorb energy from the sea waves, with various degrees of success.

An important class of devices is characterized by a fixed or floating structure, open to the sea at its submerged part. Through wave action, a water column oscillates inside, and in relation to, the structure. This relative motion, and the resulting forces, may be converted into useful energy by means of a turbine. In some systems, known as oscillating-water-column systems, the reciprocating motion of the air-water interface at the top of the oscillating water column alternately compresses and decompresses the air, which promotes the movement of an air turbine. The turbine drives, directly or indirectly, an electrical generator if the objective is the production of electrical energy.

Due to the wavy nature of the sea surface motion, the turbine is required to absorb energy from a bidirectional flow, and therefore it must be self-rectifying, unless the device is equipped with a rectifying system composed of non-return valves, which has been found unpractical and costly.

Self-rectifying air turbines have been proposed and used in bidirectional flows for wave energy conversion. The Wells turbine, described in British Patent No 1595700, is possibly the best known and most frequently used in bidirectional air flows. It is an axial-flow turbine. Its peak efficiency under stationary flow conditions may exceed 70%. However the range of flow rates within which the Wells turbine is capable of operating efficiently is relatively narrow, which results in modest time-averaged efficiencies under real irregular wave conditions. In addition, the Wells turbine is characterized by presenting relatively large rotational velocity and small torque. These characteristics may be inconvenient in wave energy applications, especially in what concerns excessive mechanical stresses in the rotating parts of the turbine and electrical generator.

The self-rectifying axial-flow impulse turbine is possibly the most frequently proposed alternative to the Wells turbine for wave energy applications. The axial-flow impulse turbine has been used since the final years of the nineteenth century as a steam turbine (the De Laval steam turbine). In the classical unidirectional flow version, the fluid is accelerated and circumferentially deflected in a row of nozzles, and then is admitted into a rotor with blades. Here it is again deflected, its exit velocity being approximately in the axial direction. The rotor blades are shaped in such a way that the rotor inlet pressure is approximately equal to the exit pressure (which characterizes an impulse turbine). In bidirectional flow applications, the turbine should perform in the same way when the incoming flow direction is reversed. Therefore, there should be two rows of nozzles or guide vanes, one on each side of the rotor, in such a way that the turbine (rotor and guide vanes) has a plane of symmetry which is perpendicular to its axis of rotation. A turbine with such an arrangement for wave energy applications is described in U.S. Pat. No. 3,922,739. As a consequence of the required symmetric arrangement, the fluid, after passing through the first row of guide vanes and the rotor, is admitted into the second row of guide vanes with an excessive angle of incidence. The misalignment between the guide vanes of the second row and the incoming flow from the rotor gives rise to large aerodynamic losses, which results in relatively poor turbine efficiency. This problem may be (at least partially) overcome if the setting angle of the guide vanes, or the vane geometry, is adjustable, and is changed whenever the direction of the flow through the turbine is reversed, as proposed in Japanese Patent No. 2064370. The practical implementation of this kind of control requires the turbine to be equipped with mechanisms that increase the construction and maintenance costs and reduce the reliability of the machine. This has hindered the use of guide vane control. An alternative method of reducing the aerodynamic losses due to the excessive angle of incidence at the entrance to the second row of guide vanes consists in increasing the distance between the guide vane rows and the rotor blades, with the aim of reducing the velocity (and hence the kinetic energy) of the flow at the entrance to the second row of guide vanes and in this way reducing the energy losses due to boundary layer separation (stalling) at those vanes. This methodology was proposed in Patent WO 2008/0112530, where it is stated that the two rows of guide vanes, one on each side of the rotor, are offset from the rotor blades, radially as well as axially, with annular ducts connecting the guide vane sets with the rotor blade row. The radial offset allows, through conservation of angular momentum, the circumferential component of the flow velocity to be reduced at the entrance to the second row of guide vanes. This radial offset, eventually combined with an increase in the gap between the inner and outer walls of the annular ducts (i.e. an increase in the blade span of the stator system), also produces a decrease in the meridian component (projected on an axial plane) of the flow velocity.

Japanese Patent No. 2008095569 proposes a turbine with a radial-flow rotor in which the flow is unidirectional and centripetal. There are two rows of guide vanes, which rectify the flow admitted to the rotor through axial displacement.

Portuguese Patent No. 104972 relates to a self-rectifying turbine. The inlet to, and outlet from, the rotor are radial, the flow direction being centripetal at the inlet and centrifugal at the outlet. The stator is provided with two rows of guide vanes located circumferentially around the rotor. The flow between each rotor inlet/outlet and the corresponding row of guide vanes is essentially radial. The connection is provided by a duct formed by two walls of revolution around the axis of rotation, one or both walls being possibly shaped as flat discs perpendicular to the axis of rotation. At the entrance to the second row of guide vanes, the velocity of the flow from the rotor may be decreased by radially offsetting the guide vanes away from the rotor. In this way, the aerodynamic losses due to the excessive angle of incidence may be reduced. An alternative way of avoiding the losses due to the excessive angle of incidence at the entrance to the second row of guide vanes consists in simply removing those guide vanes from the flow space. This can be done through the axial translation of the two sets of guide vanes, in such a way that each set is removed from the flow space depending on the flow direction.

DETAILED DESCRIPTION OF THE INVENTION

The invention relates to an air turbine capable of, without change in its rotational velocity direction, operating efficiently between two spaces (A) and (B), with pressures $p_A$ and $p_B$, respectively, such that the sign of the pressure difference $p_A-p_B$ changes periodically. For this reason, it may be employed in oscillating-water-column systems for wave energy conversion, and more generally in the utilization of the energy associated with a pressure difference whose sign changes periodically, as in some renewable energy systems or in other applications.

The turbine is shown schematically in FIG. 2, in a view of a section by an axial plane. (A) and (B) are the spaces between which the turbine operates. These spaces are separated by the turbine itself, by a wall (1) and by other walls not represented. Space (A) may be the atmosphere and space (B) the air chamber of the oscillating-water-column device, or vice-versa. The rotor blade rows (2) and (3) and the stator guide vane rows (4) and (5) are circumferentially projected onto the plane of the drawing. The rotor comprises two rows of blades (2) and (3), axially offset, fixed to a hub (6) mounted on a shaft (7). The hub consists of a single element or more than one. The stator comprehends two rows of guide vanes (4) and (5) circumferentially mounted around the rotor. The set of blades (I) consisting of the rotor blade row (2) and the stator guide vane row (4) is similar to the blade system of a conventional radial- or mixed-flow turbine (FIG. 2*a*) or to the blade system of a conventional axial-flow turbine (FIG. 2*b*); the setting angle of the stator guide vanes (4) may be fixed, or may be controllable as in the wicket gate system of the Francis turbines. The same description applies to the blade set (II) consisting of the rotor blade row (3) and the stator guide vane row (5). The stator guide vane row (4) is connected to space (A) through a duct (8), and the stator guide vane row (5) is connected to space (B) through a duct (9). The rotor blade row (2) is connected to space (B) through a curved-walled unbladed duct (10), through a duct (11) formed by two walls of revolution (12) and (13) shaped as plane or non-plane discs, and through a set of n curved-axis ducts (14) located circumferentially around the periphery of the duct (11). Identically, the rotor blade row (3) is connected to space (A) through a curved-walled unbladed duct (15), through a duct (16) formed by two walls of revolution (12) and (17) shaped as plane or non-plane discs, and through a set of n curved-axis ducts (18) located circumferentially around the periphery of duct (16). The n curved-axis ducts (18) open to space (A) circumferentially alternate with the n curved-axis ducts (14) open to space (B). The number n of ducts is comprehended between 2 and 30.

FIG. 3*a* corresponds to FIG. 2*a* and shows a section of the guide vanes (4) and the rotor blades (2) through a plane which is perpendicular to the axis of rotation. FIG. 3*b* corresponds to FIG. 2*b* and shows a section, projected onto a plane, of the guide vanes (4) and the rotor blades (2) through a cylindrical surface of revolution which is coaxial with the axis of rotation.

FIG. 4 schematically represents an axial view of the rotor from one of the spaces (A) or (B), and shows the mouths (19) of the n curved ducts open to that space, and, in dashed lines, the mouths (20) of the n curved ducts open to the other space. In the case represented in the figure, it is n=9.

FIG. 5 represents a section on a C-C plane which is perpendicular to the axis of rotation, and shows the fairings (21) intended to avoid or reduce the aerodynamic losses due to boundary layer separation in the transition from the duct (11) to the n curved-axis ducts (14) open to space (B). Identical fairings, not represented in the figure, avoid or reduce the losses in the transition from the duct (16) to the n curved-axis ducts (18) open to space (A).

FIG. 6 gives a perspective view of the n curved-axis ducts (14) and (18), open, respectively, to space (B) and space (A).

Conventional turbines in general are designed, especially in what concerns the geometry of the rotor and the stator blades, for a given sign of the available pressure difference and for a given rotational direction of the rotor, which here will be referred to as "normal". In the turbine in question, there are two blade sets: blade set (I) consisting of stator guide vane row (4) and rotor blade row (2); and blade set (II) consisting of stator guide vane row (5) and rotor blade row (3). With respect to blade set (I), the sign of the normal available pressure difference is given by $p_A-p_B>0$, and the normal flow direction is 8→4→2→10→11→14, whereas, for blade set (II), it is $p_A-p_B<0$, the normal flow direction being 9→5→3→15→16→18. The geometry of the turbine blades and guide vanes is such that the normal rotational direction is the same for both blade sets (I) and (II), which is true if the sets are symmetrical with respect to a mid-plane which is perpendicular to the axis of rotation. When $p_A-p_B>0$, the radial extent of the duct (11) allows the recovery of a large part of the kinetic energy associated with the circumferential and radial velocity components at the exit from the rotor blade row (2). When $p_A-p_B<0$, the same applies to the duct (16) and the kinetic energy of the flow at the exit from rotor blade row (3).

Assuming the rotational velocity to be in the normal direction, if the pressure difference $p_A-p_B$ is negative, then the flow through the blade set (I) is inverted. Results from laboratory tests reveal that, under such conditions, the flow rate and the torque (in absolute values) are much smaller than the corresponding values under so-called normal conditions. The same applies to the blade set (II) when the pressure difference $p_A-p_B$ is positive. Then, when $p_A-p_B>0$, the air flows, essentially and in a normal way, from space (A) to space (B) through blade set (I), and the losses of fluid associated with the inverse flow through blade set (II) are relatively small. The same can be said when $p_A-p_B<0$, by exchanging blade set (I) for blade set (II). This means that, with the adopted conception, regardless of the sign of the available pressure difference $p_A-p_B$, there is a blade set, (I) or (II), through which the energy conversion takes place efficiently; on the other hand, losses of fluid occur in the inverted flow through the other blade set; such losses have been found, by testing, to be relatively small.

These losses can be avoided if the turbine is equipped with a two-position cylindrical valve (22) as shown in FIG. 7. The valve should be in the position of FIG. 7*a* when $p_A-p_B>0$ (preventing the air from flowing through blade set (II) but not through blade set (I)), and in the position of FIG. 7*b* when $p_A-p_B<0$ (preventing the air from flowing through blade set (I) but not through blade set (II)).

Alternatively, the turbine may be equipped with a three-position cylindrical valve (23) as shown in FIG. 8. In the position of FIG. 8*a*, the valve closes the connection between spaces (A) and (B). In the position of FIG. 8*b*, the valve closes the connection between spaces (A) and (B) through blade set (II) but not through blade set (I). In the position of FIG. 8*c*, the valve closes the connection between spaces (A) and (B) through blade set (I) but not through blade set (II). This arrangement, which enables the connection between spaces (A) and (B) to be temporarily closed by fast valve action, allows the implementation of phase control through latching as a way of bringing the oscillating-water-column device closer to resonance conditions and so increasing the amount of energy absorbed from the waves.

The translational axial motion of the two-position cylindrical valve (22) or of the three-position cylindrical valve

(23) may be produced through an electrical, pneumatic, hydraulic or any other type of actuator.

The set represented in FIG. 2, comprising the two rotor blade rows (2) and (3), the two stator guide vane rows (4) and (5), and the connecting ducts (10), (11), (14) and (15), (16), (18), may be symmetrical with respect to a mid plane which is perpendicular to the axis of rotation. However, in other realizations, symmetry may be absent or only partial, for better adequacy to changing conditions when the flow direction is reversed, as is the case due to the asymmetry between crests and troughs of large amplitude waves, or due to the differences in density between the air in the chamber of the oscillating-water-column device and the air in the outer atmosphere.

This invention combines, on the one hand, the high efficiency quality of the conventional Francis turbines or the conventional gas and steam axial-flow turbines, and, on the other hand, the capability of using the energy associated with a pressure head whose sign is reversed at intervals of a few seconds, which does not involve complex mechanisms apart from a rotating rotor and the control of the translational motion of a simple valve. In particular, this turbine does not require any translational motions of guide vanes. The turbine can easily accommodate a fast acting valve that can be used to achieve the phase control through latching of the oscillating-water-column device.

It should be noted that, unlike in the rotor of the turbine described in Portuguese Patent Number 104972, neither rotor blade row (2) nor rotor blade row (3) in the configurations of FIG. 2 are required to be symmetrical with respect to a plane which is perpendicular to the axis of rotation. Because of that, those rotor blades (as the rotor blades of Francis turbines and most steam and gas turbines) may be strongly asymmetrical and adequate to operation as in reaction turbines. In the flow through reaction turbine rotors, the pressure gradient enhances boundary layer stability, which is beneficial to the aerodynamic performance of a turbine subjected to strongly varying air flow rate as occurs in oscillating-water-column wave energy converters.

Figure 1:
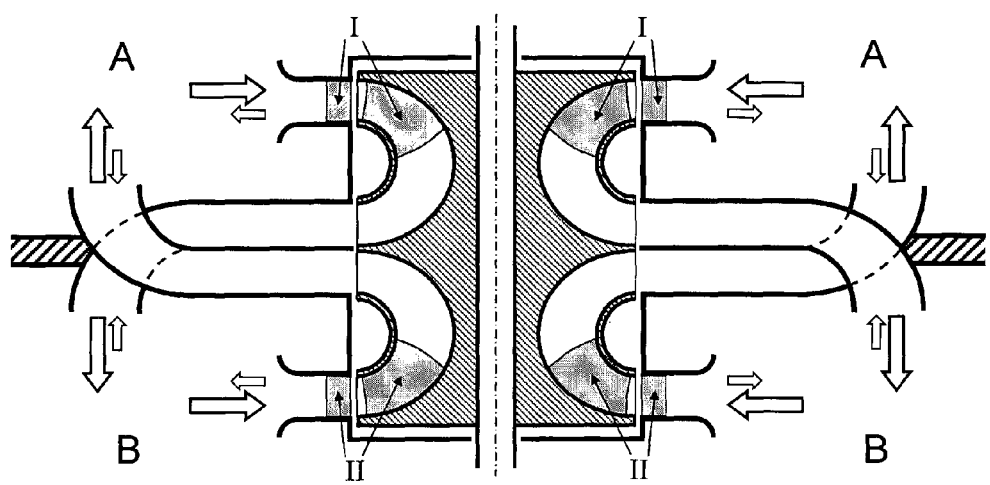
FIG. 1 schematically represents the turbine section through a plane containing its axis of rotation. (A) and (B) are the air spaces between which the turbine operates. The turbine comprises two blade sets (I) and (II), each of which is similar to the blade system of a conventional radial- or mixed-flow hydraulic turbine. The turbine also comprises a duct system that connects space (A) to space (B) through any of the blade sets (I) and (II).
Figure 2:
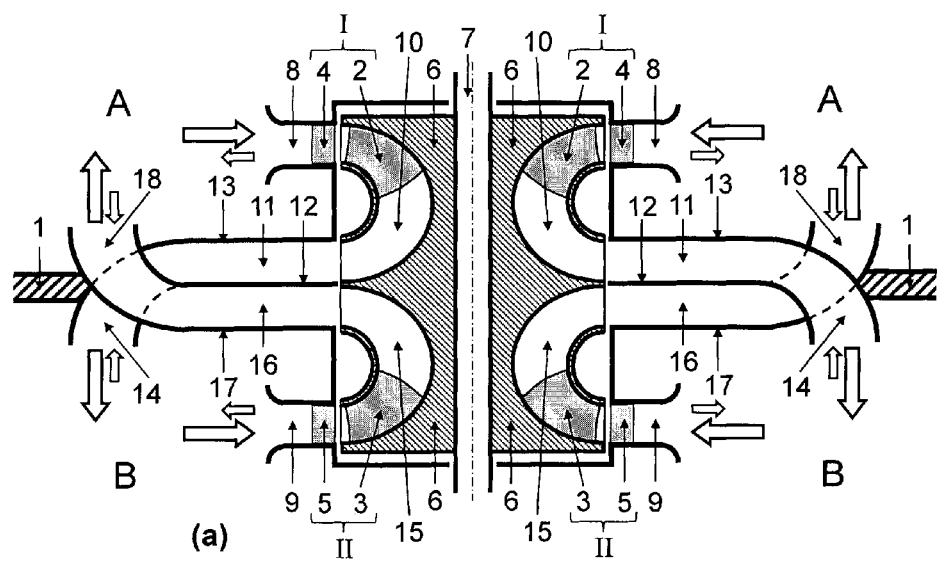
FIG. 2 schematically represents a section of the turbine through a plane containing its axis of rotation. (A) and (B) are the spaces of air between which the turbine operates. They are separated from each other by the turbine itself, by a wall (1) and by other walls not represented. Space (A) may be the atmosphere and space (B) the air chamber of the oscillating-water-column device, or vice-versa. The rotor blade rows (2) and (3) and the stator guide vane rows (4) and (5) are circumferentially projected onto the plane of the drawing. The rotor comprises two rows of blades (2) and (3), axially offset from each other, fixed to a hub (6) mounted on a shaft (7). The stator comprises two rows of guide vanes (4) and (5) circumferentially mounted around the rotor. The set of blades (I) consisting of rotor blade row (2) and stator guide vane row (4) is similar to the blade system of a conventional turbine of radial- or mixed-flow type, as represented in FIG. 2a, or to the blade system of a conventional axial-flow turbine, as represented in FIG. 2b. The setting angle of the stator guide vanes (4) may be fixed, or may be controllable as in the wicket gate system of the Francis turbines. The same description applies to blade set (II) consisting of rotor blade row (3) and stator guide vane row (5). Stator guide vane row (4) is connected to space (A) through a duct (8), and stator guide vane row (5) is connected to space (B) through a duct (9). Rotor blade row (2) is connected to space (B) through a curved-walled unbladed duct (10), through the duct (11) formed by two walls of revolution (12) and (13) shaped as plane or non-plane discs, and through a set of n curved-axis ducts (14) located circumferentially around the periphery of the duct (11). Identically, rotor blade row (3) is connected to space (A) through a curved-walled unbladed duct (15), through the duct (16) formed by two walls of revolution (12) and (17) shaped as plane or non-plane discs, and through a set of n curved-axis ducts (18) located circumferentially around the periphery of the duct (16). The n curved-axis ducts open to space (A) alternate with the n curved-axis ducts open to space (B).
Figure 2:
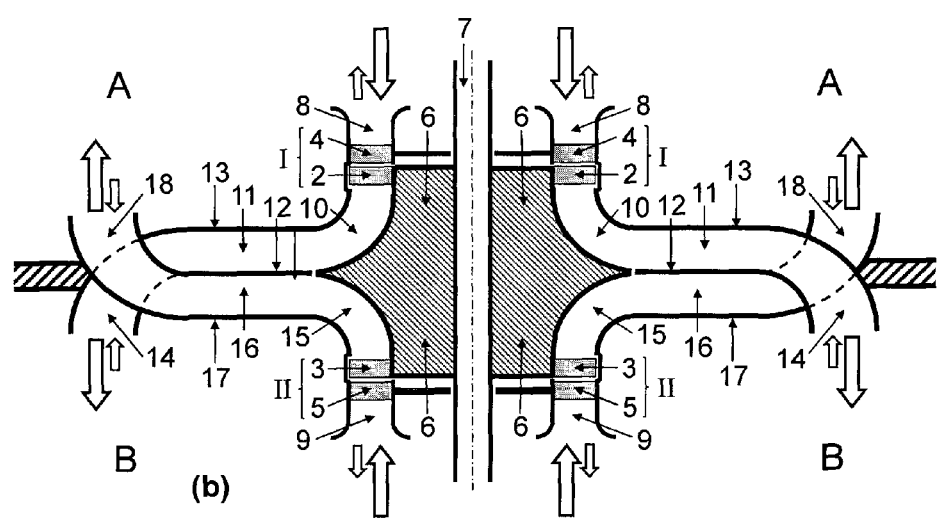
Figure 3:
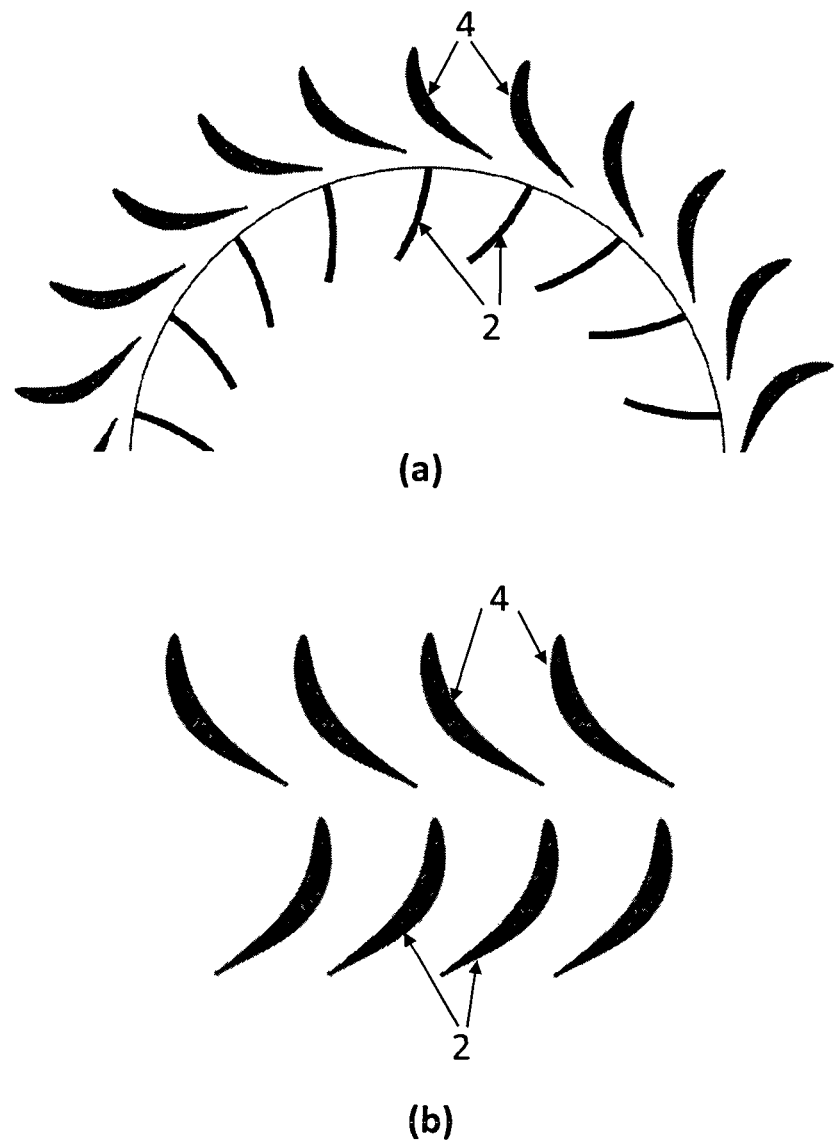
FIG. 3a corresponds to FIG. 2a, and represents a section of the stator guide vanes (4) and the rotor blades (2) through a plane which is perpendicular to the axis of rotation.
FIG. 3b corresponds to FIG. 2b, and represents a section, circumferentially projected onto a plane, of the stator guide vanes (4) and the rotor blades (2) through a cylindrical surface of revolution which is coaxial with the axis of rotation.
Figure 4:
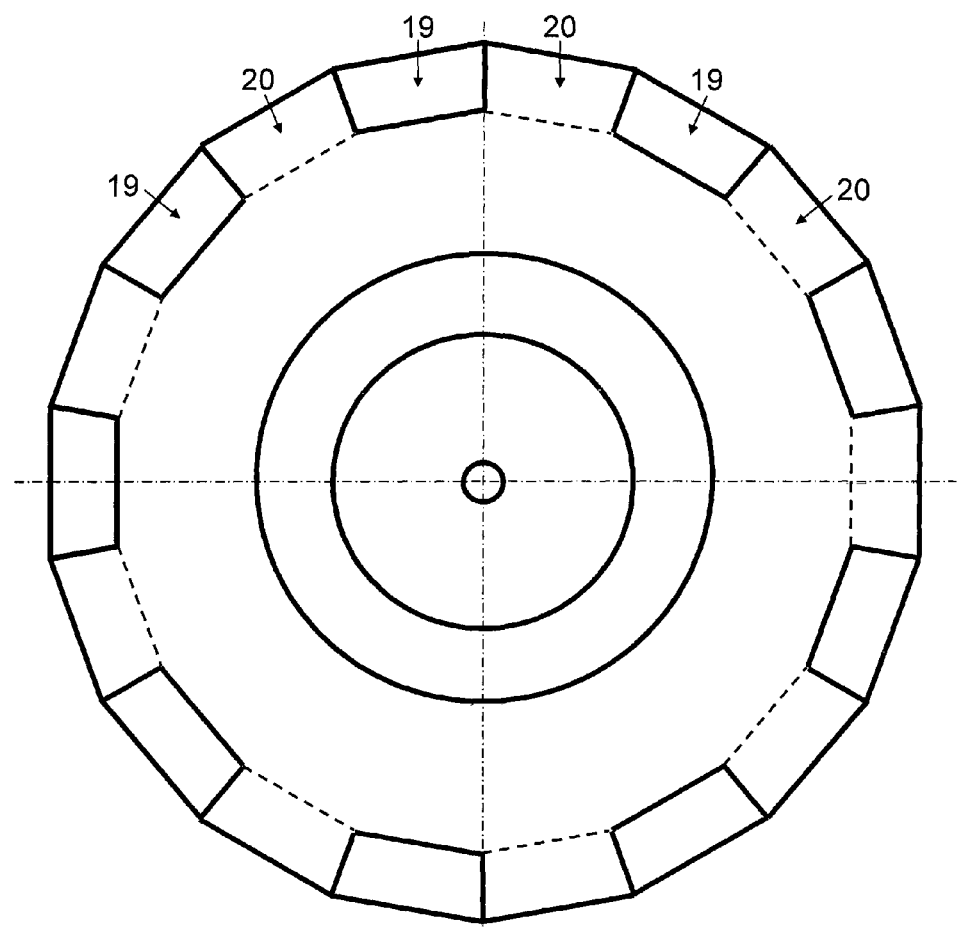
FIG. 4 schematically represents an axial view of the rotor from one of the spaces (A) or (B), showing the mouths (19) of the n curved ducts open to that space, and, in dashed lines, the mouths (20) of the n curved ducts open to the other space. In the case represented in the figure, it is n=9.
Figure 5:
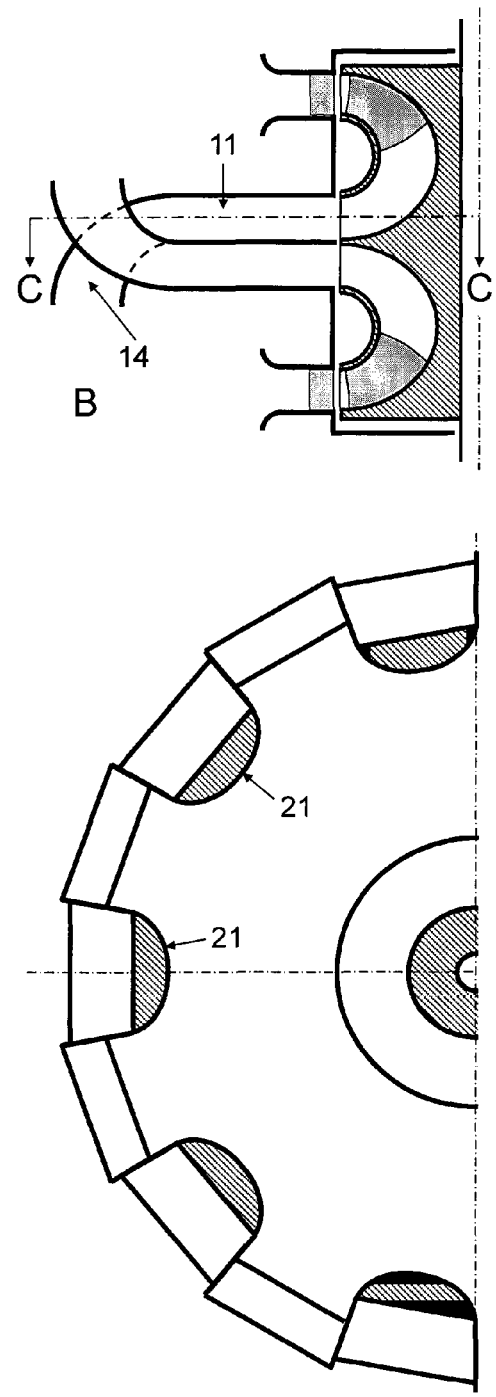
FIG. 5 represents a section on a C-C plane which is perpendicular to the axis of rotation, and shows the fairings (21) intended to avoid or reduce the aerodynamic losses due to boundary layer separation in the transition from the duct (11) to the curved ducts (14) open to space (B).
Figure 6:
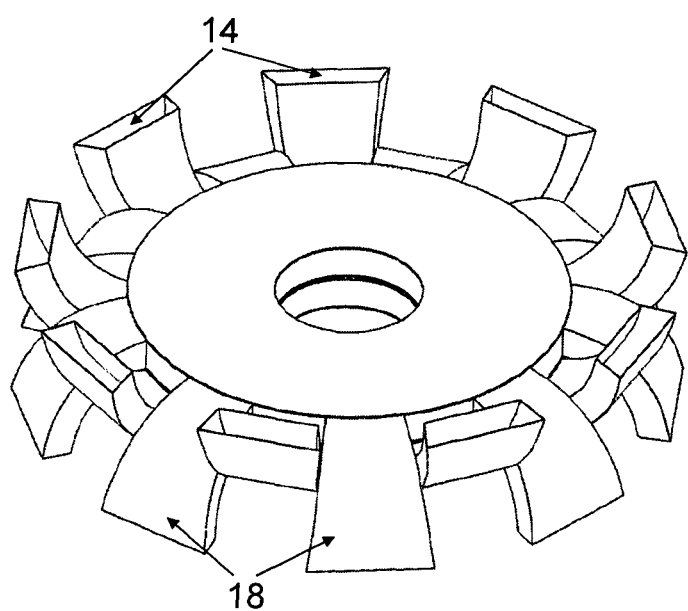
FIG. 6 gives a perspective view of the sets of n curved-axis ducts (14) and (18) open respectively to space (B) and Space (A). Spaces (A) and (B) are separated from each other by the turbine itself and by walls not represented in the figure.
Figure 7:
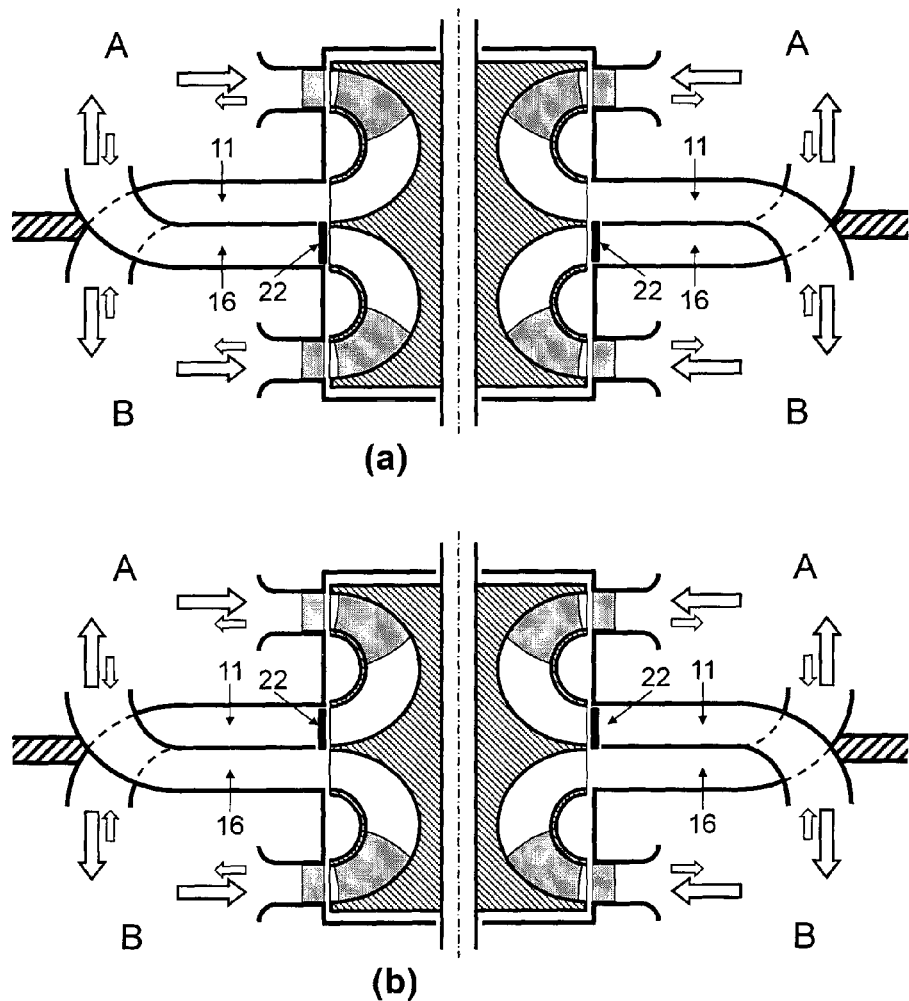
FIG. 7 corresponds to FIG. 2, with a two-position cylindrical valve (22) that may slide axially. In the position represented in FIG. 7a, the valve closes the connection between spaces (A) and (B) through the duct (16). In the position represented in FIG. 7b, the valve closes the connection between spaces (A) and (B) through the duct (11).
Figure 8:
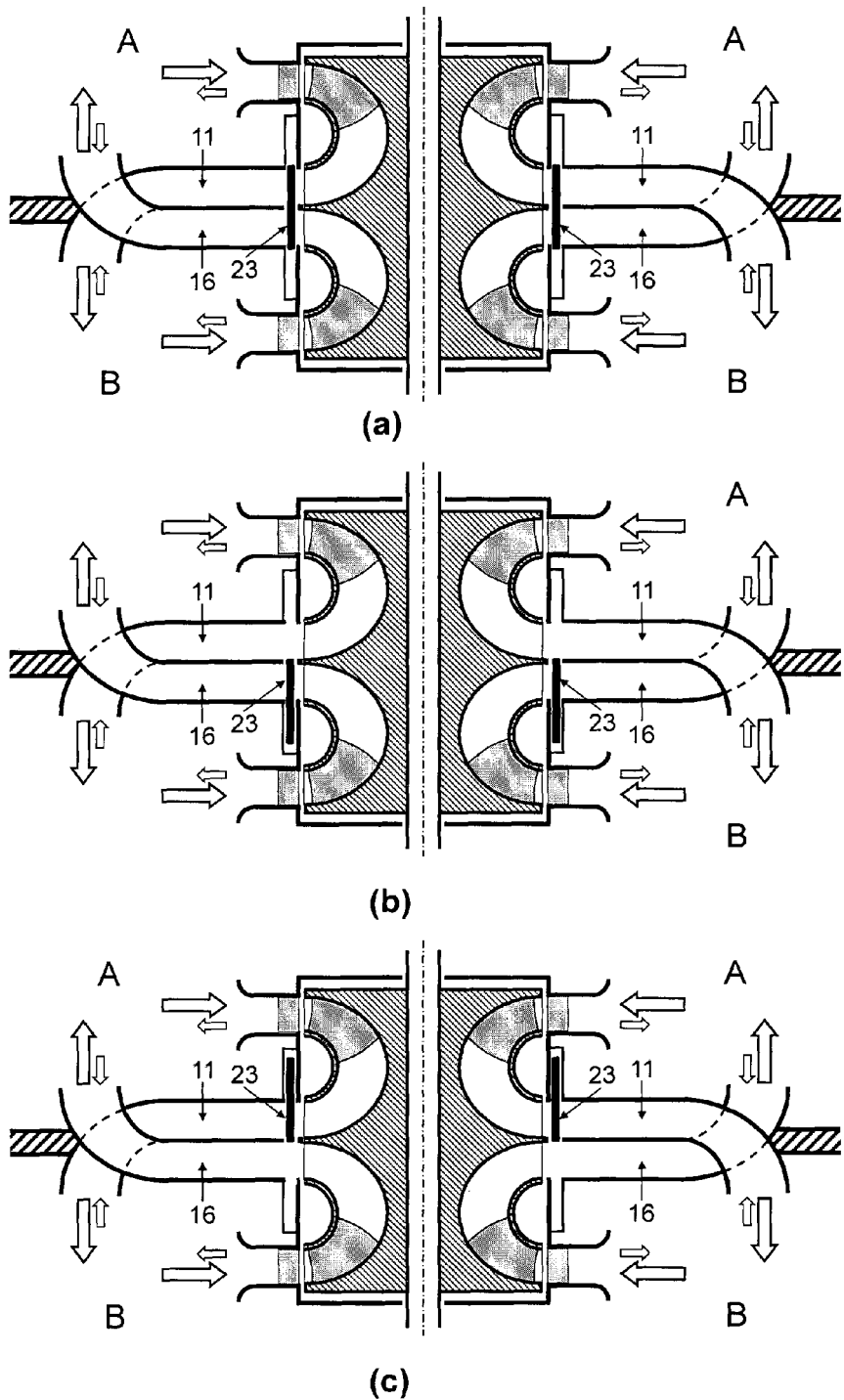
FIG. 8 corresponds to FIG. 2, with a three-position cylindrical valve (23) that can be made to move axially. In the position represented in FIG. 8a, the valve closes the connection between spaces (A) and (B) through the duct (11) as well as through the duct (16). In the position represented in FIG. 8b, the valve closes the connection between spaces (A) and (B) through the duct (16) but not through the duct (11). In the position represented in FIG. 8c, the valve closes the connection between spaces (A) and (B) through the duct (11) but not through the duct (16).

The invention claimed is:

1. Air turbine for applications in wave energy conversion associated with a pressure difference between space (A) and space (B) of alternately changing sign, comprising a rotor with two blade rows (2) and (3), axially offset from each other, circumferentially mounted on a hub (6) fixed to a shaft (7), and a stator with two rows of guide vanes (4) and (5), in which blade set (I) consisting of rotor blade row (3) and stator guide vane row (4), and blade set (II) consisting of rotor blade row (3) and stator guide vane row (5), are similar to at least one of the blading of conventional radial-flow, mixed-flow and axial-flow turbines, said turbine being characterized in that:

a) Its stator guide vane row (4) is connected to space (A) through a duct (8) and its stator guide vane row (5) is connected to space (B) through a duct (9);
  b) Its rotor blade row (2) is connected to space (B) through a curved-walled unbladed duct (10), through the duct (11) formed by two walls of revolution (12) and (13) shaped as plane or non-plane discs, and through a set of n curved-axis ducts (14) disposed circumferentially around the duct (11), n being an integer between 2 and 30;
  c) Its rotor blade row (3) is connected to space (A) through a curved-walled unbladed duct (15), through a duct (16) formed by two walls of revolution (12) and (17) shaped as plane or non-plane discs, and through a set of n curved-axis ducts (18) disposed circumferentially around the duct (16);
  d) Its n curved-axis ducts (14), open to space (B), alternate circumferentially with the n curved-axis ducts (18) open to space (A).

2. A turbine according to claim 1 wherein the stator contains an axially sliding two-position cylindrical valve (22) that closes, depending on its axial position, the connection between the duct (11) and rotor blade row (2), or the connection between the duct (16) and rotor blade row (3).

3. A turbine according to claim 1 wherein the stator contains an axially sliding three-position cylindrical valve (23) that closes, depending on its axial position, the connection between the duct (11) and rotor blade row (2), or the connection between the duct (16) and rotor blade row (3), or both connections.

* * * * *